Sept. 4, 1956  A. B. BECKER  2,761,689
AIRPLANE SIMULATING ATTACHMENT FOR TRICYCLES
Filed Dec. 18, 1953  2 Sheets-Sheet 1

INVENTOR.
ARTHUR B. BECKER,
BY
McMorrow, Berman + Davidson
ATTORNEYS.

Sept. 4, 1956 A. B. BECKER 2,761,689
AIRPLANE SIMULATING ATTACHMENT FOR TRICYCLES
Filed Dec. 18, 1953 2 Sheets-Sheet 2
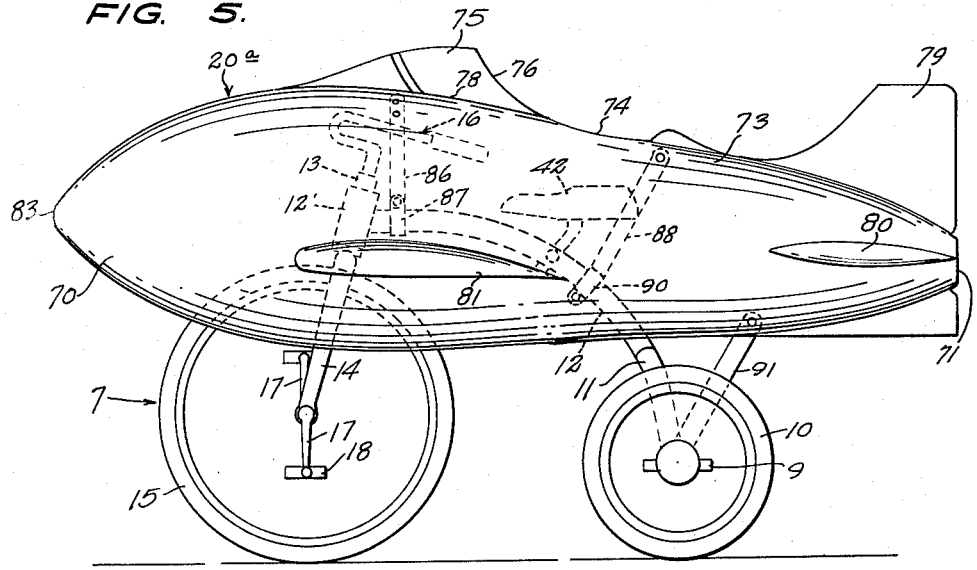
INVENTOR.
ARTHUR B. BECKER,
BY
McMorrow, Berman & Davidson
ATTORNEYS.

United States Patent Office 2,761,689
Patented Sept. 4, 1956

2,761,689

AIRPLANE SIMULATING ATTACHMENT FOR TRICYCLES

Arthur Bernard Becker, Norwich, Conn.

Application December 18, 1953, Serial No. 398,957

4 Claims. (Cl. 280—1.21)

This invention relates to tricycles having stabilizer means being either built-in or removably or permanently attachable to tricycles, and the stabilizer means being in the forms of sectional bodies or integral bodies.

Among important objects of the invention are to provide decorative and low cost means of converting an ordinary tricycle into the likeness of an airplane, rocket ship, submarine, train, or other desired simulation, so as to achieve such simulation without the greater cost of providing a complete miniature vehicle, and without incurring the greater wind resistance and weight of such a vehicle; to enable interchangeable use of different bodies on the same tricycle; to provide bodies of this kind in sectional form such that they can be readily removed from a tricycle and stored compactly; to provide bodies of this kind which serve as vertical stabilizers to reduce accidental tipping over of a tricycle and to serve as front and rear bumpers for the tricycle; and to provide bodies of this kind in which safety belts, headrests, back rests, canopies and other safety and protective features can be readily incorporated.

Other important objects and advantageous features of the invention will be apparent from the following description and the accompanying drawings, wherein, for purposes of illustration rather than limitation, specific embodiments of the invention are set forth in detail.

In the drawings:

Figure 5 is a left hand side elevation, with interior parts in phantom lines, of another embodiment of the invention involving an integral body; and Figure 6 is a top plan view thereof, partly in horizontal section.

Figure 1:
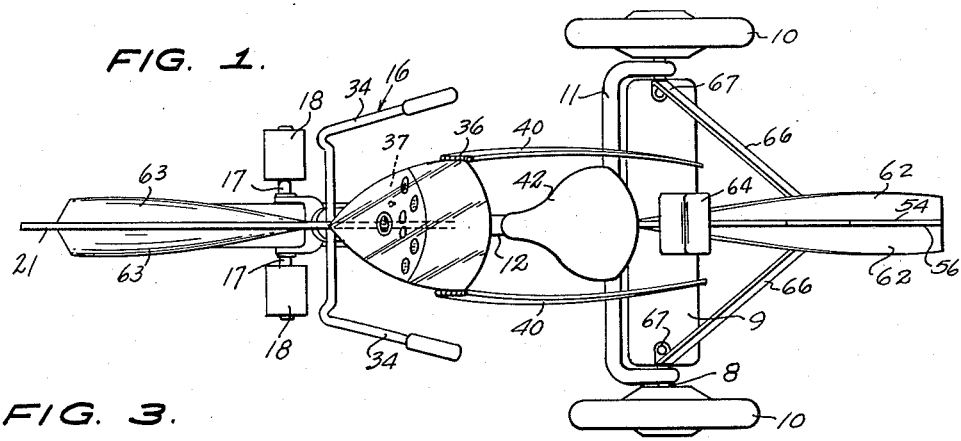
Figure 1 is a top plan view of an embodiment involving a sectional body.
Figure 3:
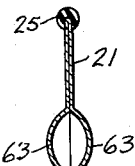
Figure 3 is a transverse vertical section taken on the line 3—3 of Figure 2.
Figure 2:
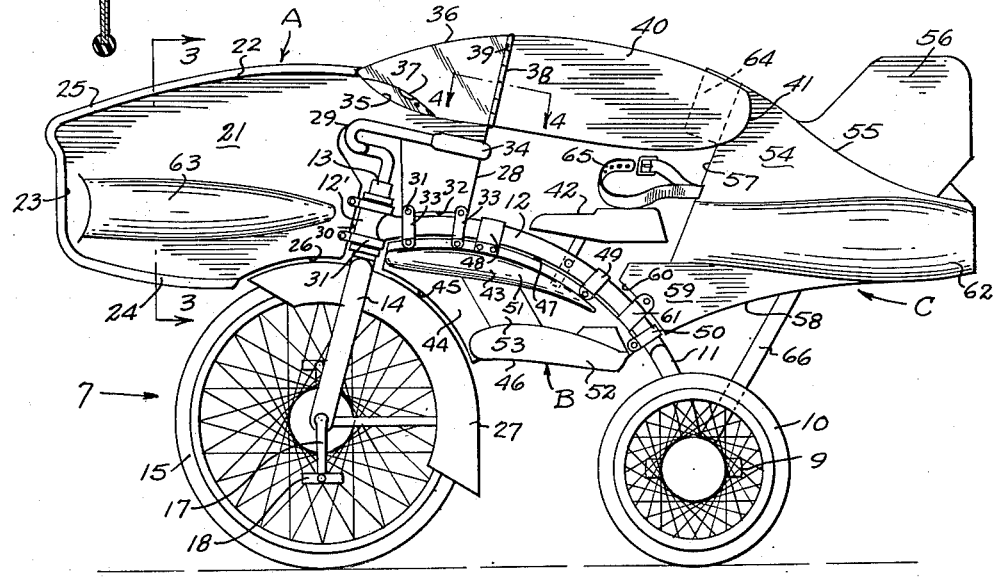
Figure 2 is a left hand side elevation thereof.
Figure 4:
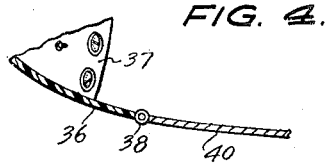
Figure 4 is a fragmentary horizontal section taken on the line 4—4 of Figure 2.

Referring in detail to the drawings, wherein like numerals designate like parts throughout the several views, and first to the embodiment of the invention shown in Figures 1 to 4 thereof, the numeral 7 generally designates a conventional tricycle having a rear axle 8 surmounted by a step 9 and having two rear wheels 10, 10. The frame of the tricycle includes a fork 11 rising from the rear axle 8 and an upwardly bowed longitudinal bar 12 extends forwardly from the middle of the fork 11 and is joined at its forward end to the vertical tube 12' in which is journalled the steering post 13. The steering post 13 has a front wheel fork 14 in which is mounted the single front wheel 15. On the upper end of the steering posts 13 are the handle bars 16. The front wheel 15 includes pedal cranks 17 and pedals 18.

The body of Figures 1 to 4, which is generally designated 20, is sectional, and comprises the forward or nose section A, the intermediate or fuselage section B, and the rear or tail section C.

The forward section A comprises a flat or plate vertical substantially ablong panel 21 having a forwardly and downwardly curving upper edge 22, a substantially perpendicular front edge 23 curved merged thereinto, and a downwardly and rearwardly curved lower edge 24. The edges 22, 23 and 24 are preferably covered by rubber edging 25 for safe contact with persons and objects. A rearmost part of the lower edge 24 is concaved, as indicated at 26, to conform to the contours of the front wheel 15 and a mudguard 27 mounted thereover.

The panel 21 has a straight vertical rear edge 28 which is located a short distance behind the steering post tube 12' which is preferably covered by a rubber edging 28'. An irregularly contoured notch 29, extending upwardly from the lower edge 24 of the panel 21, provides operating clearance for the handle bars 16 and provides a forward notch edge 30 which can bear against the front of the tube 12' and to which ring clamps 31, 31 are secured which supportably embrace the tube 12', so as to provide a point of support for the panel 21 on the tricycle 7. The part 32 of the lower edge 24 of the panel 21 behind the notch 29 bears upon the upper side of the frame bar 12 and has ring clamps 33, 33 thereon which embrace the frame bar 12 and whereby a secured point of support for the panel 21 is provided.

It will be noted that the panel 21 prevents either one of the handles 34, 34 of the handle bars 16 from swinging beyond a safe angle, by acting as a stop therefor, so that upsets due to complete turning of the handle bars 16 are eliminated.

On a concaved rear part 35 of the upper edge 22 of the panel 21 is fixed a forward tapered convex-concave dummy windshield 36 which extends laterally beyond the sides of the panel 21. A convex dummy instrument panel 37 is mounted on the edge part 35 within the forward part of the windshield 36.

Hinged, as indicated at 38, to opposite side portions of the rear edge 39 of the windshield 36 are cowling panels or flaps 40, 40. The cowling panels 40, 40 are horizontally elongated and terminate in rounded rear ends 41, 41 which are located rearwardly of the tricycle seat 42 which is mounted on a rearward part of the longitudinal frame bar 12. The cowling panels 40, 40 are unsecured to the rear body section C or to the intermediate body section B.

The intermediate or fuselage body section B comprises a forwardly and rearwardly elongated, tapered, and round cross section member 43 from which depends a flat panel 44 having a forward edge 45 contoured to the mudguard 27, a horizontal lower edge 46, and a curved upper edge 47 contoured to the underside of the frame bar 12. Forward, intermediate, and rearward ring clamps 48, 49, 50, respectively, embrace the frame bar 12 and secure the panel 44 in place. Airplane wing section outlines 51 and 52 connected by a strut 53 may be formed on the sides of the panel 44 to give the illusion of airplane wing structure.

The tail or rear body section C comprises a flat plain vertical longitudinal panel 54 of generally triangular, rearwardly tapering shape, which has an upper edge 55 provided with a vertical stabilizer fin 56, a straight vertical forward edge portion 57, a forwardly declining lower edge 58, and a projection 59 below the forward edge portion 57. The projection 59 extends forwardly beyond the forward edge portion 57 and has itself a forward edge 60 contoured to the upper side of the frame bar 12 and provided with a ring clamp 61 embracing the frame bar 12. The opposite sides of the panel 54 at the middle height thereof are provided with longitudinal streamlined bulges 62, 62 which afford the impression of jet exhausts, just as kindred bulges 63, 63 on the opposite sides of the panel 21 of the front body section A give the impression of jet intakes.

A headrest pad 64 may be attached to an upper part of the forward edge portion 57 of the panel 54, and a safety belt 65 at a point therebelow.

Diagonal braces 66, 66 are secured, as indicated at 67, to the tricycle step 9 at the ends thereof, and to the lower edge 58 of the panel 54, their connections to the lower edge 58 being at a point spaced rearwardly from the rear wheels.

Any suitable and desired materials may be employed in the construction of the above described embodiment of the invention, as also in the construction of the embodiment of Figures 5 and 6 of the drawings, hereinafter described, such as sheet metal, plastics, wood, canvas on frames, or any combinations of such materials, important considerations being lightness in weight and structural adequacy.

Referring now to Figures 5 and 6 of the drawings, the integral body therein shown and generally designated 20a, is substantially elliptical in horizontal longitudinal cross section and cigar-shaped in vertical longitudinal cross section. The body 20a has a conical forward end or nose 70 from which the body 20a tapers rearwardly to a rear end 71 which is squared to give the impression of a jet exhaust, the rear end 71 being indented, as indicated at 72, 72 to accentuate the impression of a jet exhaust.

The body 20a is preferably molded or otherwise fabricated in one piece and has a top wall 73 provided intermediate the ends of the body with a semi-elliptical, longitudinally extending cockpit opening 74, whose tapering forward part is closed by a convex-concave windshield 75 which has a concave rear edge 76. The windshield 75 is preferably secured at its side edges 77, 77 to corresponding portions 78, 78 of the side edges of the cockpit opening 74.

A vertical stabilizer fin 79 rises from the body top wall 73 behind the cockpit opening 74 and extends almost to the rear end 71. Contoured horizontal stabilizer fins 80, 80, which are preferably hollow, as shown in Figure 6, extend from the opposite sides of the body 20a, in the region of the vertical stabilizer fin 79 and reach to the rear end 71 of the body 20a.

Preferably hollow contoured wing stubs 81, 81 project laterally from the side walls 82, 82 of the body 20a in the region of the windshield 75.

The body 20a completely encloses the upper part of a tricycle 7 with the tip 83 of the nose 70 positioned forwardly of the tricycle front wheel 15, the windshield 75 over the handle bars 16, and the tricycle seat 42 exposed in the cockpit opening 74 behind the windshield 75, and with the rear end 71 of the body reaching rearwardly beyond the tricycle rear wheels 10, 10.

Means for mounting the body 20a removably or permanently on the tricycle 7 comprises a forward transverse band or strip 84, secured as indicated at 85, to the inner side of the body 20a and having a vertical strut 86 terminating at its lower end in a ring clamp 87 embracing the tricycle frame bar 12 at a point close to the steering post tube 12'.

The said mounting means further includes rear braces or strips 88, 88 secured, as indicated at 89, to the inner side of the body 20a at points behind the cockpit opening 74, and terminating at their lower and laterally inward ends in a ring clamp 90 embracing a rearward lower part of the frame bar 12 above the frame fork 11. In addition, rearwardly and upwardly angulated braces 91, 91 having their lower ends secured to opposite ends of the tricycle step 9, as indicated at 92, 92, have their upper ends secured, as indicated at 93, 93 to lower portions of the body side walls 82, 82 at the inner sides thereof.

The underside of the body 20a is open, as indicated at 95, the opening 95 following the general outline of the body 20a.

What is claimed is:

1. In a tricycle, an airplane simulating body therefor comprising a nose portion adapted to project forwardly beyond the front wheel of the tricycle, a fuselage portion located behind said nose portion and adapted to extend between the handlebars and the seat of said tricycle, and a tail portion located behind said fuselage portion and adapted to extend rearwardly beyond the rear wheels of said tricycle, each of the said nose, fuselage and tail portions being separate parts, said nose portion being a single vertical longitudinal front panel having a vertical rear edge and a lower edge, said lower edge provided with a notch adapted to receive the steering post and a part of the handlebars of said tricycle, first clamp means on said panel adapted to embrace the steering post of said tricycle, and second clamp means on said panel adapted to embrace the longitudinal bar of said tricycle frame.

2. The structure according to claim 1 including in addition a convex-concave windshield mounted on the upper part of the longitudinal front panel of said nose portion and reaching to the vertical rear edge of the front panel, said windshield extending laterally outwardly beyond the opposite sides of said front panel.

3. The structure according to claim 1 including in addition a convex-concave windshield mounted on the upper part of the longitudinal front panel of said nose portion and reaching to the vertical rear edge of the front panel, said windshield extending laterally outwardly beyond the opposite sides of said front panel, said windshield having a rear edge, and horizontal cowling panels having forward ends hinged on the rear edge of the windshield at opposite sides of the windshield and extending rearwardly along opposite sides of the tricycle seat as far as said tail portion.

4. The structure according to claim 1 wherein said tail portion comprises a single vertical longitudinal rear panel having a front vertical edge located behind the seat of said tricycle, a rear end, and a lower edge, a forward extension in the region of the lower end of said front vertical edge of the rear panel, said extension having an edge bearing upon the upper side of said longitudinal frame bar at a point behind the seat of said tricycle, third clamping means on the lower part of said rear panel adapted to embrace the longitudinal bar of said tricycle frame, and depending brace means secured to the lower part of said rear panel and adapted to be fixed to the rear axle structure of said tricycle.

References Cited in the file of this patent

UNITED STATES PATENTS

| 1,135,337 | Bunau-Varilla | Apr. 13, 1915 |
| 1,562,244 | Morrill | Nov. 17, 1925 |
| 2,758,432 | Crow | May 13, 1930 |

FOREIGN PATENTS

| 963,651 | France | Jan. 4, 1950 |
| 106,915 | Switzerland | Sept. 16, 1924 |